(12) United States Patent
Wang et al.

(10) Patent No.: US 10,969,471 B2
(45) Date of Patent: Apr. 6, 2021

(54) METHOD FOR IDENTIFYING ICE CRYSTAL FABRIC AND DISTRIBUTION CHARACTERISTICS OF ICE FLOW FIELD IN ICE SHEET BASED ON POLARIMETRIC RADAR

(71) Applicant: Zhejiang University, Hangzhou (CN)

(72) Inventors: Bangbing Wang, Hangzhou (CN); Bo Sun, Hangzhou (CN); Jiaxin Wang, Hangzhou (CN); Gang Tian, Hangzhou (CN); Zhanjie Shi, Hangzhou (CN); Wenke Zhao, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/801,139

(22) Filed: Feb. 25, 2020

(65) Prior Publication Data

US 2020/0191912 A1 Jun. 18, 2020

Related U.S. Application Data

(63) Continuation of application No. PCT/CN2019/104941, filed on Sep. 9, 2019.

(51) Int. Cl.
*G01S 7/41* (2006.01)
*G01S 7/02* (2006.01)
*G01S 13/88* (2006.01)

(52) U.S. Cl.
CPC .............. *G01S 7/411* (2013.01); *G01S 7/025* (2013.01); *G01S 13/88* (2013.01)

(58) Field of Classification Search
CPC ........... G01S 7/411; G01S 7/025; G01S 13/88
See application file for complete search history.

(56) References Cited

U.S. PATENT DOCUMENTS 10,107,904 B2 * 10/2018 Reis ................... G01S 13/9023
2013/0099960 A1 * 4/2013 Broman ................. G01S 15/88
342/25 A (Continued)

FOREIGN PATENT DOCUMENTS

CN  103605166 B  9/2014
CN  105242245 A  1/2016

(Continued)

OTHER PUBLICATIONS

J. Dall, "Ice sheet anisotropy measured with polarimetric ice sounding radar," 2010 IEEE International Geoscience and Remote Sensing Symposium, Honolulu, HI, 2010, pp. 2507-2510, doi: 10.1109/IGARSS.2010.5653528. (Year: 2010).*

(Continued)

*Primary Examiner* — Marcus E Windrich (57) ABSTRACT

The present disclosure discloses a method for identifying ice crystal fabric and distribution characteristics of ice flow field in ice sheet based on polarimetric radar. Because there is a correlation between the second-order fabric azimuth tensor and the dielectric constant tensor of the ice crystals inside the ice sheet, the present disclosure obtains the dielectric constant tensor of each reflection layer inside the ice sheet and its rotation angle from the polarimetric radar echo signal by the layer-by-layer recursive method, and then calculates to obtain the characteristic value of the second-order fabric orientation tensor and identifies its fabric type. After that, according to the correlation among the fabric, stress deformation and the ice flow to extract the information of ice flow direction and its spatial distribution characteristics.

3 Claims, 6 Drawing Sheets

(56) References Cited

U.S. PATENT DOCUMENTS

2014/0159938 A1* 6/2014 Shipley .................. G01V 3/17
  342/22
2018/0158202 A1* 6/2018 Cai ...................... G06K 9/0063

FOREIGN PATENT DOCUMENTS

CN   107103280 A   8/2017
CN   109283526 A   1/2019

OTHER PUBLICATIONS

Wang, Bangbing et al. The internal COF features in Dome A of Antarctica revealed by multi-polarization-plane RES Applied Geophysiscs Sep. 30, 2008 3rd, vol. 5 ISSN: 1672-7975, pp. 230-237, p. 247.

Kenichi, Matsuoka et al. Crystal orientation fabrics within the Antarctic ice sheet revealed by a multipolarization plane and dual-frequency radar survey Journal of Geophysical Research Oct. 24, 2003 B10th, vol. 108 ISSN:2169-9356, pp. 1-17.

Wang, Bangbing, et al. Study on the internal structure characteristics of the Antarctic ice sheet—based on the finite-difference time-domain method of three-dimensional anisotropic electromagnetic waves. Earth Physics Mar. 30, 2009, 4th, vol. 52 ISSN: 0001-5733, Sections 1-4.

\* cited by examiner

Fig. 5D

METHOD FOR IDENTIFYING ICE CRYSTAL FABRIC AND DISTRIBUTION CHARACTERISTICS OF ICE FLOW FIELD IN ICE SHEET BASED ON POLARIMETRIC RADAR

CROSS REFERENCE TO RELATED APPLICATIONS

This application is a continuation of PCT Patent Application No. PCT/CN2019/104941, filed on Sep. 9, 2019, entitled "METHOD FOR IDENTIFYING ICE CRYSTAL FABRIC AND DISTRIBUTION CHARACTERISTICS OF ICE FLOW FIELD IN ICE SHEET BASED ON POLARIMETRIC RADAR," which claims foreign priority of Chinese Patent Application No. 201811257205.2, filed Oct. 26, 2018 in the China National Intellectual Property Administration, the entire contents of which are hereby incorporated by reference in their entireties.

TECHNICAL FIELD

The present disclosure relates to the technical field of radar exploration, and in particular to a method for identifying ice crystal fabric and distribution characteristics of the ice flow field in ice sheet based on the polarimetric radar.

BACKGROUND

Ice crystal fabric is a technical term used for describing the statistical characteristics of the geometric distribution of the optical axis (C-axis) orientation of ice crystals. The ice crystal fabric is a history product of ice sheet flow and deformation. The position and depth of ice crystals will change during the ice sheet flow and evolution. Correspondingly, the magnitude and direction of the stresses will also change, which will cause the ice crystals to deform and the preferred direction of C-axis will change as well, thereby various fabric types (random, single-pole, elongated single-pole and vertical girdle, etc.) are formed. The ice crystal fabric keeps historical information about the stress and deformation of the ice sheet during the flow and evolution process, which is of great significance for the restoring and reconstructing the ice sheet evolution process. On the other hand, the ice crystal fabric shows obvious anisotropy, and the deformation degree of different types of fabrics under stress is obviously different. The macroscopic representation is that the viscosity of ice with different fabrics is significantly different, which has another feedback effect on the flow process of the ice sheet. Therefore, the ice crystal fabric is a key indicator of the rheology, evolution, and dynamic processes of the ice sheet. It is of great significance for understanding and predicting the stability of ice sheets and their evolution trends, and has become a key constraint parameter for ice sheet modeling.

Currently, the way to obtain ice crystal fabric information can only come from laboratory test analysis of a large number of deep ice core samples: By performing polarized light analysis of ice sample slices, statistics of the distribution characteristics of the ice crystal in the C-axis direction can be used to obtain the fabric type. Since the time-consuming, labor-intensive and cost of drilling in polar regions is high, for now, there are only a few deep ice cores drilling in the North and South Poles. For the vast ice sheet, it is difficult to grasp the spatial distribution characteristics and evolution rules of ice crystals fabrics in the entire ice sheet from only a few drilled holes. This makes the distribution and evolution mechanism of the fabric in the ice sheet the most uncertain factor in polar research.

The fluctuation of the subglacial topography and the diversity of the fabric types of ice crystals have created complex ice flow fields inside the ice sheet. The flow velocity and flow direction of ice are important characteristic indicators for studying the evolution of ice sheets. The direction and velocity of the ice flow on the surface can be directly observed by measuring and positioning instruments, but the ice flow condition inside the ice sheet is always a mystery. Currently, there is no particularly effective test method, it can only be predicted by the ice sheet modeling (numerical simulation) method. But the ice flow information itself is a key constraint parameter that needs to be used in the study of ice sheet modeling. At present, the only way to predict the ice flow information is assuming a flow model first, and then comparing the ice surface velocity in the model calculation results with the field measurement results to verify and evaluate the matching degree on the ice surface part. However, the stress and ice flow conditions inside the ice sheet are more complicated, especially near the bottom of the ice sheet, and the stress and ice flow conditions are severe affected by the subglacial topography. The "blank" of ice flow information inside the ice sheet has become another uncertain factor in the stability evaluation and evolution prediction of the ice sheet.

The most important thing is that due to the fluctuation of the subglacial topography and the ice crystal texture variation caused by the climate change, there is a significant vertical heterogeneity (soft/hard ice) in the ice flow field and the fabric distribution of the interior of the ice sheet. This vertical heterogeneity directly affects the lateral expansion and flow velocity of the inner layer of the ice sheet, forming more complex fabric types, and then affecting the evolution of the ice sheet. However, it is difficult for the existing technology to effectively grasp the distribution and evolution of this heterogeneity, which has become the key point and technical difficulty of the current ice sheet research. Although the commonly used single polarized ice radar has achieved great success in the study of ice sheets, which can obtain geometric parameters such as the isochronous layers in ice and the subglacial topography, it is powerless to the research of the fabric distribution, the state of stress/strain and the characteristics of ice flow in the ice sheet. Multi-polarization radar has the potential to study the anisotropic characteristics of the internal fabric of the ice sheet. However, the theory of electromagnetic wave propagating in multi-layer anisotropic ice layer is too complicated, which severely restricts the application of multi-polarization radar in ice sheet research.

SUMMARY

In view of the disadvantages of the prior art, the present disclosure provides a method for identifying ice crystal fabric and distribution characteristics of ice flow field in ice sheet based on polarimetric radar.

A method for identifying ice crystal fabric and distribution characteristics of ice flow field in ice sheet based on polarimetric radar, can include the following steps:

S1: acquiring radar data of four channels, $E_{HH}^r$, $E_{HV}^r$, $E_{VH}^r$ and $E_{VV}^r$, by the orthogonal arrangement receiving and transmitting antenna of the polarimetric radar;

S2: performing normalization processing on the radar data $E_{HH}^r$, $E_{HV}^r$, $E_{VH}^r$ and $E_{VV}^r$ obtained in step 1 to obtain the radar echo records of four channels $R_{HH}$, $R_{HV}$, $R_{VH}$ and $R_{VV}$;

$$\overline{R} = \begin{bmatrix} R_{HH} & R_{VH} \\ R_{HV} & R_{VV} \end{bmatrix} = \begin{bmatrix} \frac{E_{HH}^r}{E_H^i} & \frac{E_{VH}^r}{E_V^i} \\ \frac{E_{HV}^r}{E_H^i} & \frac{E_{VV}^r}{E_V^i} \end{bmatrix} \quad (1)$$

wherein, $E_H^i$ represents an electric field intensity of incident wave in an H direction, and $E_V^i$ represents an electric field intensity of incident wave in a V direction;

S3: performing deconvolution processing on the radar echo records of four channels $R_{HH}$, $R_{HV}$, $R_{VH}$ and $R_{VV}$, to obtain the generalized reflection coefficient sequences of four channels $\tilde{R}_{HH}$, $\tilde{R}_{HV}$, $\tilde{R}_{VH}$ and $\tilde{R}_{VV}$, recorded together as $$\tilde{R} = \begin{bmatrix} \tilde{R}_{HH} & \tilde{R}_{VH} \\ \tilde{R}_{HV} & \tilde{R}_{VV} \end{bmatrix};$$

S4: calculating the eigenvalue and deflection angle of dielectric permittivity tensor in each layer from top to bottom by layer-by-layer recursive method, wherein the derivation from the first layer to the n−1 layer is shown in formula (2), and the interface reflection coefficient matrix formula, transmission coefficient matrix formula and reverse transmission coefficient matrix formula are shown in formulas (3) to (5), respectively:

$$\begin{cases} \tilde{R}_{12} = \overline{R}_{12} \\ \tilde{R}_{23} = \overline{T}_{12} \cdot e^{-j\bar{k}_2 d_2} \cdot \overline{R}_{23} \cdot e^{-j\bar{k}_2 d_2} \cdot \overline{T}_{21} \\ \tilde{R}_{34} = \overline{T}_{12} \cdot e^{-j\bar{k}_2 d_2} \cdot \overline{T}_{23} \cdot e^{-j\bar{k}_3 d_3} \cdot \overline{R}_{34} \cdot e^{-j\bar{k}_3 d_3} \cdot \overline{T}_{32} \cdot e^{-j\bar{k}_2 d_2} \cdot \overline{T}_{21} \\ \tilde{R}_{45} = \overline{T}_{12} \cdot e^{-j\bar{k}_2 d_2} \cdot \overline{T}_{23} \cdot e^{-j\bar{k}_3 d_3} \cdot \overline{T}_{34} \cdot e^{-j\bar{k}_4 d_4} \cdot \overline{R}_{45} \cdot e^{-j\bar{k}_4 d_4} \cdot \\ \qquad \overline{T}_{43} \cdot e^{-j\bar{k}_3 d_3} \cdot \overline{T}_{32} \cdot e^{-j\bar{k}_2 d_2} \cdot \overline{T}_{21} \\ \quad \cdots \\ \tilde{R}_{n-1,n} = \overline{T}_{12} \cdot e^{-j\bar{k}_2 d_2} \cdot \overline{T}_{23} \cdots \overline{T}_{n-2,n-1} \cdot e^{-j\bar{k}_{n-1} d_{n-1}} \cdot \\ \overline{R}_{n-1,n} \cdot e^{-j\bar{k}_{n-1} d_{n-1}} \cdot \overline{T}_{n-1,n-2} \cdots \overline{T}_{32} \cdot e^{-j\bar{k}_2 d_2} \cdot \overline{T}_{21} \end{cases} \quad (2)$$

$$\begin{cases} \overline{R}_{i,i+1} = \begin{bmatrix} R_{HH}^{(i)} & R_{HV}^{(i)} \\ R_{VH}^{(i)} & R_{VV}^{(i)} \end{bmatrix} \\ = -\frac{1}{|B_a|} \begin{bmatrix} (1+d)(1-a) + \\ (1+b)(1-c)tg^2(\varphi_{i+1}-\varphi_i) & 2(d-b)tg(\varphi_{i+1}-\varphi_i) \\ 2(c-a)tg(\varphi_{i+1}-\varphi_i) & (1+a)(1-d) + \\ & (1+c)(1-b)tg^2(\varphi_{i+1}-\varphi_i) \end{bmatrix} \\ |B_a| = (1+a)(1+d) + (1+b)(1+c)tg^2(\varphi_{i+1}-\varphi_i) \\ a = \sqrt{\frac{\varepsilon_{i,1}}{\varepsilon_{i+1,1}}} \quad b = \sqrt{\frac{\varepsilon_{i,2}}{\varepsilon_{i+1,1}}} \quad c = \sqrt{\frac{\varepsilon_{i,1}}{\varepsilon_{i+1,2}}} \quad d = \sqrt{\frac{\varepsilon_{i,2}}{\varepsilon_{i+1,2}}} \end{cases} \quad (3)$$

$$\overline{T}_{i,i+1} = \\ \frac{2\cos(\varphi_{i+1}-\varphi_i)}{|B_a|} \begin{bmatrix} a(1+d) + & (b+ad)tg(\varphi_{i+1}-\varphi_i) + \\ (a+bc)tg^2(\varphi_{i+1}-\varphi_i) & b(1+c)tg^3(\varphi_{i+1}-\varphi_i) \\ -(c+ad)tg(\varphi_{i+1}-\varphi_i) - & d(1+a) + \\ c(1+b)tg^3(\varphi_{i+1}-\varphi_i) & (d+bc)tg^2(\varphi_{i+1}-\varphi_i) \end{bmatrix} \quad (4)$$

$$\overline{T}_{i+1,i} = \frac{2\sec(\varphi_{i+1}-\varphi_i)}{|B_a|} \begin{bmatrix} (1+d) & (1+b)tg(\varphi_{i+1}-\varphi_i) \\ (1+c)tg(\varphi_{i+1}-\varphi_i) & (1+a) \end{bmatrix} \quad (5)$$

wherein, $\overline{R}_{i,i+1}$ represents the interface reflection coefficient matrix between the ith layer and the (i+1)th layer, $\overline{T}_{i,i+1}$ represents the interface transmission coefficient matrix between the ith layer and the (i+1)th layer, $\overline{T}_{i+1,i}$ represents the reverse interface transmission coefficient matrix between the ith layer and the (i+1)th layer, $\tilde{\overline{R}}_{i,i+1}$ represents the generalized reflection coefficient matrix of the interface between the ith layer and the (i+1)th layer in the radar echo record, $e^{-j\bar{k}_i d_i}$ represents the phase factor matrix of the ith layer, and $d_i$ represents the thickness of the ith layer; because the layer above the first ground surface is isotropic air layer, the eigenvalue of the dielectric permittivity tensor is 1, and the rotation angle is 0, that is, $\varepsilon_{11}=1$, $\varepsilon_{12}=1$, $\varepsilon_{13}=1$ and $\phi_1=0$, substituting them into the formulas (1) to (3) to solve to obtain the eigenvalues $\varepsilon_{21}$, $\varepsilon_{22}$ and the rotation angle $\phi_2$ of the dielectric permittivity tensor of the second layer, and then calculating the interface transmission coefficient matrix $T_{12}$ and the reverse transmission coefficient matrix $T_{21}$ by formulas (4) to (5), and then recursively in order to calculate the eigenvalue and rotation angle of the dielectric permittivity tensor of the n layer;

S5: calculating the eigenvalues $\alpha_1^{(2)}$, $\alpha_2^{(2)}$ and $\alpha_3^{(2)}$ of the second-order orientation tensor of each layer according to the eigenvalues $\varepsilon_{11}$, $\varepsilon_{12}$ and rotation angle $\phi_i$ of the dielectric constant tensor of each layer obtained from S4, and according to the formulas (6) and (7) of the correlation between the orientation tensor and the dielectric permittivity tensor of ice crystal fabric;

$$a_j^{(2)} = \frac{\sqrt{\varepsilon_{i,j}} - \sqrt{\varepsilon_\perp}}{\sqrt{\varepsilon_\parallel} - \sqrt{\varepsilon_\perp}} \quad j=1,2; \; i \text{ is the layer number;} \quad (6)$$

$$a_3^{(2)} = 1 - a_1^{(2)} - a_2^{(2)} \quad (7)$$

wherein, $\varepsilon_\perp$ and $\varepsilon_\parallel$ represent the dielectric constants that perpendicular to the c-axis and parallel to the C-axis respectively, which are measured in the laboratory; the second-order fabric orientation tensor calculated according to formula (6) and formula (7) is used to determine the fabric type of the ice crystal;

S6: because the C-axis of ice crystal tends to gather in the direction of the positive pressure axis, perpendicular to the shear force axis and far away from the tensile force axis, the fabric type of the ice crystal and the orientation characteristics of the C-axis obtained in S5 also reflect the stress state and deformation degree of the crystal; determining the stress state of the ice crystal according to the fabric type and the distribution characteristics of the C-axis, in which the direction of tensile force is the direction of ice flow; extracting the flow direction of ice layer with different depth layer by layer, to obtain the spatial distribution characteristics of ice flow field.

In some embodiments, the deconvolution processing in S3 uses a sparse spike deconvolution method.

In some embodiments, the reflection coefficient matrix formula of the layer interface (3) is deformable as formulas (8) or (9) to use to solve eigenvalues $\varepsilon_{i+1,1}$, $\varepsilon_{i+1,2}$ of the dielectric permittivity tensor of the lower layer, and as formulas (10) or (11) to use to solve the rotation angle $\phi_{i+1}$ of the lower layer:

$$\begin{cases} (1+a)(1+b)(R_A + R_B \cdot c)(R_C + R_D \cdot d) = \\ \quad (1+c)(1+d)(R_A + R_B \cdot a)(R_C + R_D \cdot b) \\ 2(c-a)(b-d)^2(R_A + R_B \cdot c) + (1+a)(b-d)^2(R_A + R_B \cdot c)^2 + \\ \quad R_{HV}^{(i)} \cdot R_{HV}^{(i)}(1+b)(1+c)(1+d)(c-a)^2 = 0 \\ R_A = R_{HH}^{(i)} + 1 \quad R_B = R_{HH}^{(i)} - 1 \quad R_C = R_{VV}^{(i)} + 1 \quad R_D = R_{VV}^{(i)} - 1 \end{cases} \quad (8)$$

-continued $$\begin{cases} (1+a)(1+b)(R_A+R_B\cdot c)(R_C+R_D\cdot d) = \\ \quad (1+c)(1+d)(R_A+R_B\cdot a)(R_C+R_D\cdot b) \\ 2(c-d)(a-c)^2(R_C+R_D\cdot b)+(1+d)(a-c)^2(R_C+R_D\cdot b)^2+ \\ \quad R_{VH}^{(i)}\cdot R_{VH}^{(i)}(1+a)(1+b)(1+c)(b-d)^2 = 0 \\ R_A = R_{HH}^{(i)}+1 \quad R_B = R_{HH}^{(i)}-1 \quad R_C = R_{VV}^{(i)}+1 \quad R_D = R_{VV}^{(i)}-1 \end{cases} \quad (9)$$

$$\begin{cases} tg(\varphi_{i+1}-\varphi_i) = \dfrac{R_{HV}^{(i)}(1+d)(c-a)}{(b-d)(R_A+R_B\cdot c)} \\ R_A = R_{HH}^{(i)}+1 \quad R_B = R_{HH}^{(i)}-1 \end{cases} \quad (10)$$

$$\begin{cases} tg(\varphi_{i+1}-\varphi_i) = \dfrac{R_{VH}^{(i)}(1+a)(b-d)}{(a-c)(R_C+R_D\cdot c)} \\ R_C = R_{VV}^{(i)}+1 \quad R_D = R_{VV}^{(i)}-1 \end{cases} \quad (11)$$

wherein, the sums $R_{HH}^{(i)}$, $R_{HV}^{(i)}$, $R_{VH}^{(i)}$ and $R_{VV}^{(i)}$ in the formulas (8) to (11) are the four components of the interface reflection coefficient matrix $\overline{R}_{i,i+1}$ between the ith layer and the (i+1)th layer obtained by the formula (3).

Compared with the prior art, the advantageous effects of the present disclosure include:

1. Rapid, efficient, non-destructive, and low cost: The present disclosure only needs to use polarimetric radar data and directly extract the fabric parameters and ice flow information through polarized data processing technology, avoiding the high investment and long time-consuming of the traditional deep ice core sample test.

2. Radar detection has flexible measurement methods and large coverage, and can obtain three-dimensional spatial distribution information of the fabric. Traditionally, through deep ice core analysis, only one-dimensional fabric distribution information in the depth direction at the drilling site o can be obtained, but the ice flow information cannot be accurately obtained from deep ice core. Because the deep ice core drilling sites are all isolated and sparse, it is difficult to summarize the spatial distribution characteristics and evolution rules of the fabric throughout the ice sheet. And the radar survey can flexibly arrange the survey lines (including aerial surveys), and it is easy to realize wide range and three-dimensional surveys.

3. Make full use of the technical advantages of polarimetric radar and obtain more information. polarimetric radar field collection is similar to that of traditional radar, with high collection efficiency and easy to implement wide-range rapid measurement. Polarimetric radar measurements can not only obtain information such as the internal isochronous layer, ice thickness, and subglacial topography which can be obtained by conventional radars, but also further obtain important information such as the fabric and the internal spatial distribution of ice flow fields in the ice sheet. The organic integration of these key information will help to further understand the evolution mechanism and dynamic process of the ice sheet. More importantly, radar lines can organically connect isolated deep ice core drilling points, making full use of existing drilling hole data to achieve comparative verification, checking and complement each other.

BRIEF DESCRIPTION OF THE DRAWINGS

FIGS. 5A-5D are cross-sectional comparison diagram of a polarimetric radar component used in the present disclosure, in which FIGS. 5A and 5B show the energy difference of radar echoes in different polarization directions caused by the anisotropy of ice fabric in VV and VH orthogonal directions.

DETAILED DESCRIPTION OF THE DISCLOSURE

The present disclosure will be described in detail according to the drawings and preferred embodiments, and the object and effect of the present disclosure will become more apparent. The present disclosure will be further described in detail in combination with the drawings and embodiments as below. It should be understood that the specific embodiments described herein are only for explaining the present disclosure, not intended to limit it.

Figure 1:
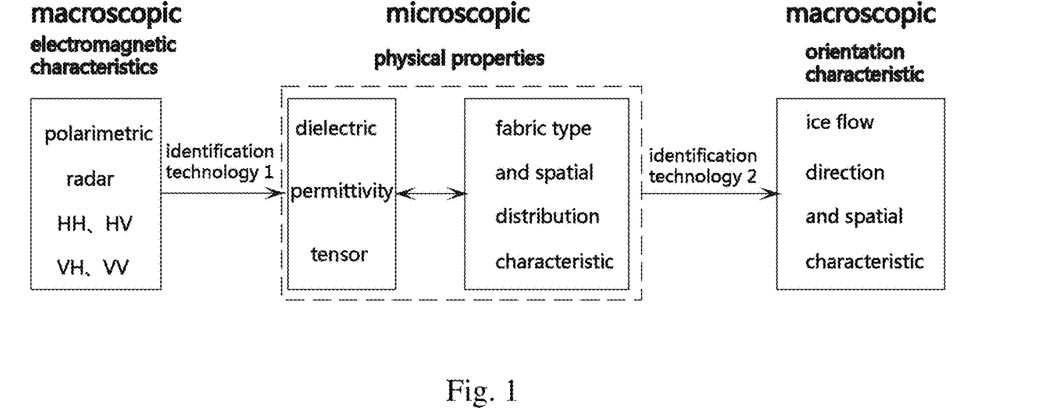
FIG. 1 is a schematic flowchart of a method for identifying ice crystal fabric and distribution characteristics of ice flow field in ice sheet based on polarimetric radar according to the present disclosure.

As shown in FIG. 1, it is a schematic flowchart of a method for identifying ice crystal fabric and distribution characteristics of ice flow field in ice sheet based on polarimetric radar. The key of the identification technology 1 is to use the correlation between the microscopic fabric orientation tensor and the dielectric constant tensor to establish the relational expression of the reflection coefficient obtained by the macroscopic polarimetric radar and the microscopic fabric physical properties. In this way, the fabric type is directly calculated and identified by the polarimetric radar data. The identification technology 2 is based on that the formation of microscopic ice crystal fabrics is a result caused by stress and deformation. According to the correlation between stress, fabric and ice flow, an identification method of ice flow direction is established, and then the spatial distribution characteristics of ice flow are obtained.

Figure 2:
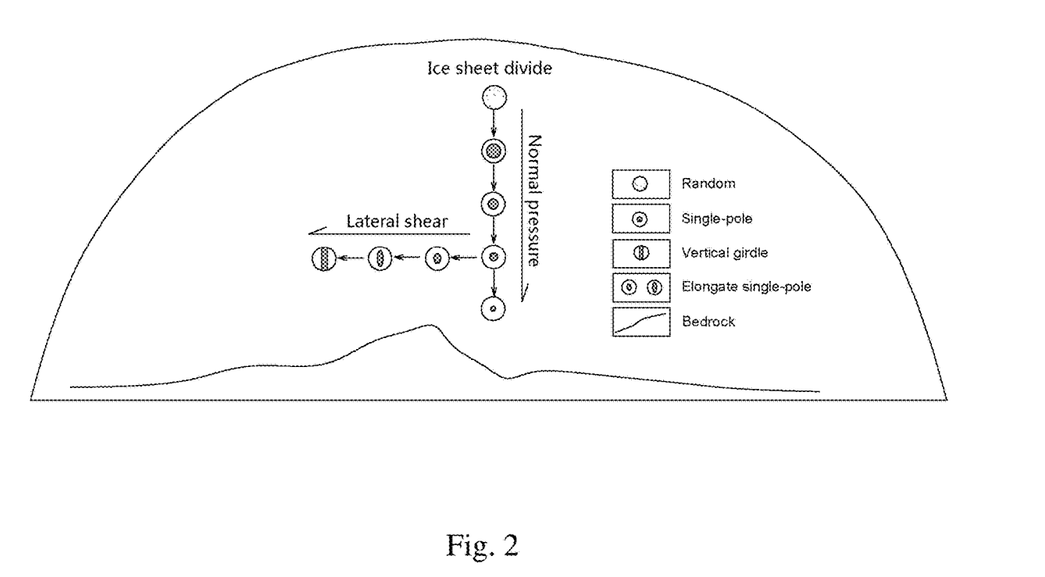
FIG. 2 is a schematic diagram of internal stress distribution and fabric evolution of an ice sheet used in the present disclosure.
Figure 3:
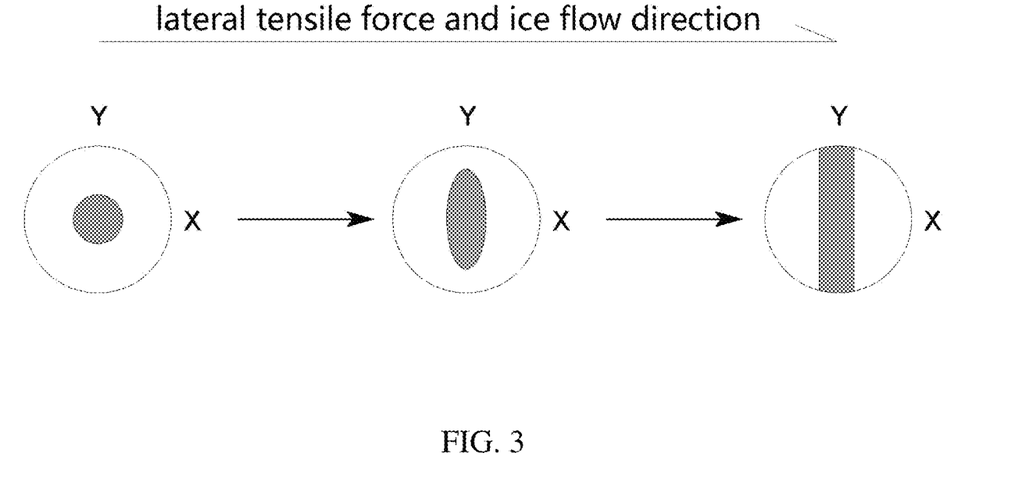
FIG. 3 is a schematic diagram showing the relationship between the internal fabric evolution of the ice sheet and the direction of ice flow used in the present disclosure.

1. Two Expressions of Physical Properties of Ice Fabric and the Correlation thereof The vast ice sheet is composed of a large number of ice crystals. In the initial snowfall, the C-axis of ice crystal is often randomly distributed. Because of the weak stress action, the fabric type is still random in the shallow part of the ice sheet with the depth less than 700 m. With the gradual increase of gravity and lateral shear force, the C-axis of ice crystal gradually tends to the dominant direction (related to the stress direction), and there are many types of fabric: single-pole, strong single-pole, elongated single-pole and vertical girdle, as shown in FIG. 2. Different fabric types often appear in the specific area and depth in the ice sheet: for example, the single-pole often appears in the ice dome area, and the elongated single-pole is due to the combined effect of vertical positive pressure and small lateral shear force. The vertical girdle is mainly in the middle and lower reaches of the ice sheet, which is the result of strong lateral shear force. Ice fabric is the product of long-term stress on ice crystals in ice sheet, which reflects the dynamic process and deformation history of ice sheet. single-pole and vertical girdle are two extreme cases of lateral shear action in the evolution process of fabric, while elongated single-pole is between them, and its elongated degree reflects the degree and history of lateral shear force, as shown in FIG. 2-3. The experimental results show that the effects of shear force in the direction of C-axis and perpendicular to C-axis of ice crystal is tens of times different, and it is easier to slide and deform in the direction perpendicular to C-axis. Therefore, the ice crystal fabric, stress/deformation and ice flow field distribution are closely related.

As far as the optical properties are concerned, the ice crystal fabric can be characterized by the second-order orientation tensor, which is a statistical parameter for the C-axis directions of all crystals. There are only 6 second-order symmetric matrices with independent parameters in 9 parameters.

$$\overline{C} = \begin{bmatrix} a_{xx}^{(2)} & a_{xy}^{(2)} & a_{xz}^{(2)} \\ a_{xy}^{(2)} & a_{yy}^{(2)} & a_{yz}^{(2)} \\ a_{xz}^{(2)} & a_{yz}^{(2)} & a_{zz}^{(2)} \end{bmatrix} \quad (1)$$

The eigenvector of the second-order symmetric matrix indicates the direction of the principal axis. The eigenvalues $\alpha_1^{(2)}$, $\alpha_2^{(2)}$ and $\alpha_3^{(2)}$ are the three principal axis components in the principal axis coordinate system, and satisfy the following relations:

$$\alpha_1^{(2)} + \alpha_2^{(2)} + \alpha_3^{(2)} = 1 \quad (2)$$

In terms of electromagnetic properties, the ice fabric can be characterized by the second-order dielectric permittivity tensor:

$$\overline{\varepsilon} = \begin{bmatrix} \varepsilon_{xx} & \varepsilon_{xy} & \varepsilon_{xz} \\ \varepsilon_{xy} & \varepsilon_{yy} & \varepsilon_{yz} \\ \varepsilon_{xz} & \varepsilon_{yz} & \varepsilon_{zz} \end{bmatrix} \quad (3)$$

Similarly, in the principal axis coordinate system, only three eigenvalues $\varepsilon_1$, $\varepsilon_2$ and $\varepsilon_3$ of the dielectric permittivity tensor in the principal diagonal direction are retained.

$$\overline{\varepsilon} = \begin{bmatrix} \varepsilon_1 & 0 & 0 \\ 0 & \varepsilon_2 & 0 \\ 0 & 0 & \varepsilon_3 \end{bmatrix} \quad (4)$$

Table 1 shows the relationship between fabric type, fabric orientation tensor and dielectric permittivity tensor.

TABLE 1

| Fabric type | fabric orientation tensor | dielectric constant tensor |
|---|---|---|
| random | $a_1^{(2)} = a_2^{(2)} = a_3^{(2)} = 1/3$ | $\varepsilon_1 = \varepsilon_2 = \varepsilon_3$ |
| single-pole | $a_1^{(2)} = a_2^{(2)} \approx 0, a_3^{(2)} \approx 1$ | $\varepsilon_1 = \varepsilon_2 = \varepsilon_\perp, \varepsilon_3 = \varepsilon_\parallel$ |
| elongated single-pole | $a_1^{(2)} < a_2^{(2)} \ll a_3^{(2)}$ | $\varepsilon_1 < \varepsilon_2 \ll \varepsilon_3$ |
| vertical girdle | $a_1^{(2)} \approx 0, a_2^{(2)} = a_3^{(2)} = 0.5$ | $\varepsilon_1 = \varepsilon_\parallel, \varepsilon_2 = \varepsilon_3 (\varepsilon_\parallel + \varepsilon_\perp)/2$ |

For fabric identification, the three eigenvalues of the orientation tensor and dielectric constant tensor can be used to identify fabric types. Both of them have similar parametric expressions and have the following relationships:

$$\overline{n} = n_\perp \overline{I} + \Delta n \overline{C} \quad (5)$$

wherein $\overline{n}$ is the refractive index tensor, $\overline{C}$ is the fabric orientation tensor, $n_\perp (\approx \sqrt{3.189})$ and $n_\parallel (\approx \sqrt{3.189})$ are the refractive index in C-axis direction of ice crystal and perpendicular to the C-axis direction (corresponding to the measured value at −21° C.) respectively, $\Delta n = n_\parallel - n_\perp$ is the difference between the two. The relationship between refractive index and dielectric permittivity is:

$$n = \sqrt{\mu \varepsilon} \quad (6)$$

In the principal axis direction, formula (5) is simplified as the expression of the correlation between the eigenvalues $\alpha_1^{(2)}$, and $\alpha_2^{(2)}$ and $\alpha_3^{(2)}$ of the fabric orientation tensor and the eigenvalues $\varepsilon_1$, $\varepsilon_2$ and $\varepsilon_3$ of the dielectric constant tensor:

$$a_j^{(2)} = \frac{\sqrt{\varepsilon_{i,j}} - \sqrt{\varepsilon_\perp}}{\sqrt{\varepsilon_\parallel} - \sqrt{\varepsilon_\perp}} j = 1, 2; \quad (7)$$

$$a_3^{(2)} = 1 - a_1^{(2)} - a_2^{(2)} \quad (8)$$

wherein, $\varepsilon_\perp$ and $\varepsilon_\parallel$ represent the dielectric permittivity s that perpendicular to the c-axis and parallel to the C-axis respectively, which are measured in the laboratory; $\varepsilon_{i,j}$ represents the eigenvalue of the dielectric permittivity tensor of the ith layer along j direction.

Therefore, as long as the dielectric permittivity tensors $\varepsilon_{i1}$ and $\varepsilon_{i2}$ are obtained, the eigenvalues of fabric orientation tensors $\alpha_1^{(2)}$ and $\alpha_2^{(2)}$ can be calculated by formula (7). Then, $\alpha_3^{(2)}$ is calculated according to formula (8). In terms of fabric type identification, conversion to fabric orientation factor or direct use of dielectric constant (or refractive index) value can be used to determine fabric type. The correlation between ice crystal fabric optics and electromagnetic physical properties, that is, formula (5)-(8) constitutes the theoretical basis of fabric identification technology by using polarimetric radar.

2. Extraction and Identification Technology of the Fabric and the Ice Flow characteristic parameters based on polarimetric radar.

Figure 4:
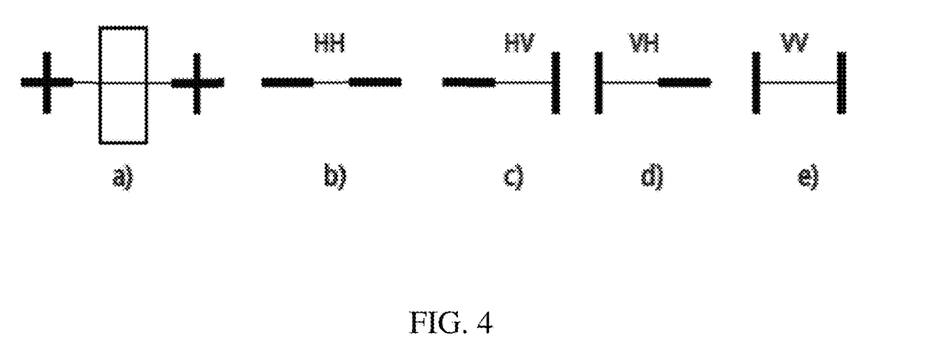
FIG. 4 is showing a polarimetric radar orthogonal antenna used in the present disclosure and an antenna combination manner thereof.
Figure 5A:
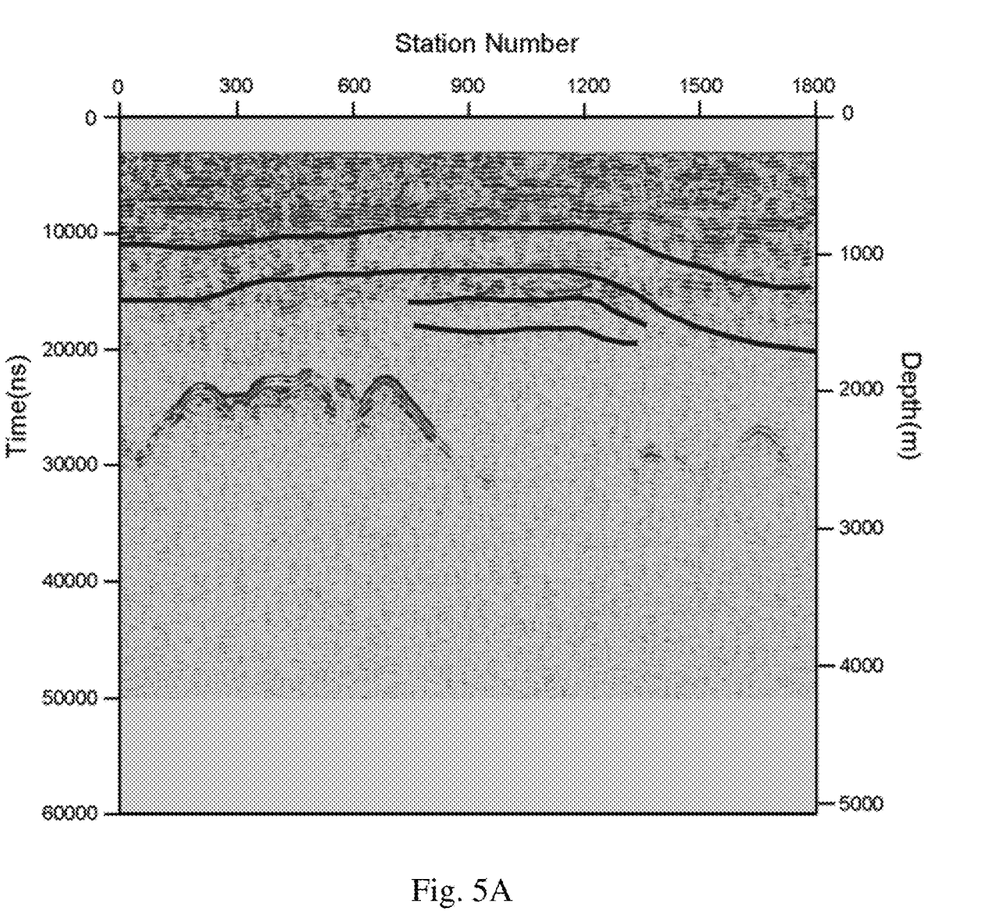
Figure 5B:
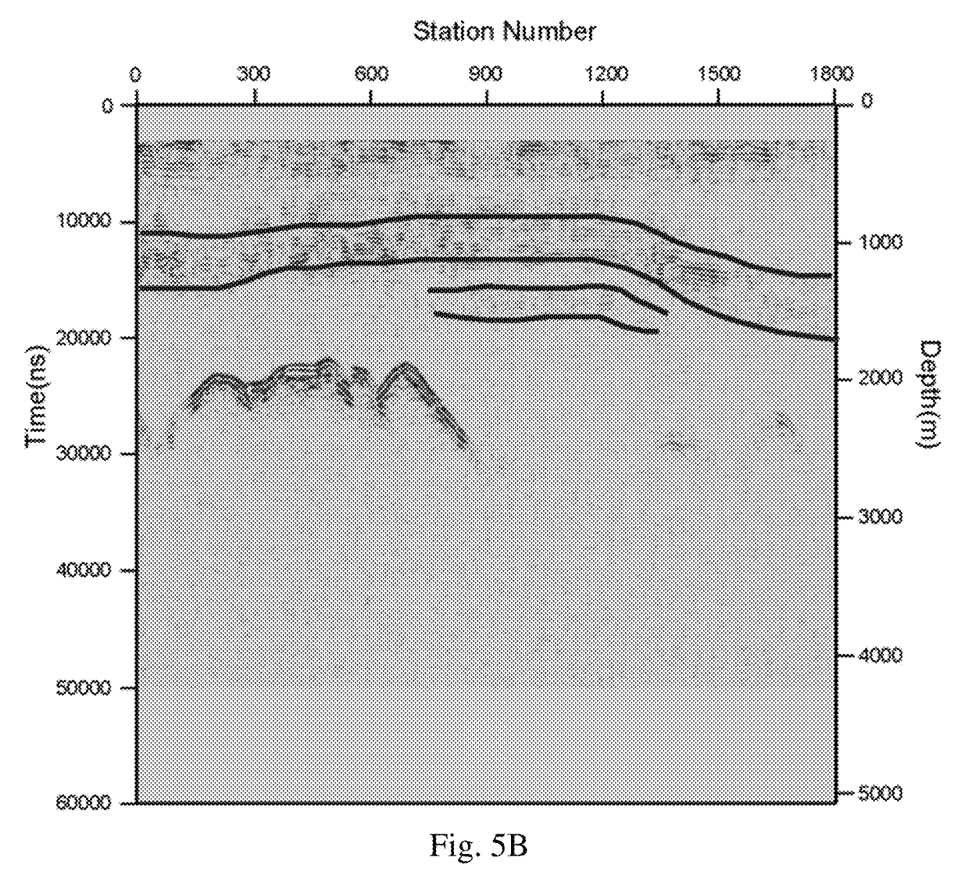
Figure 5C:
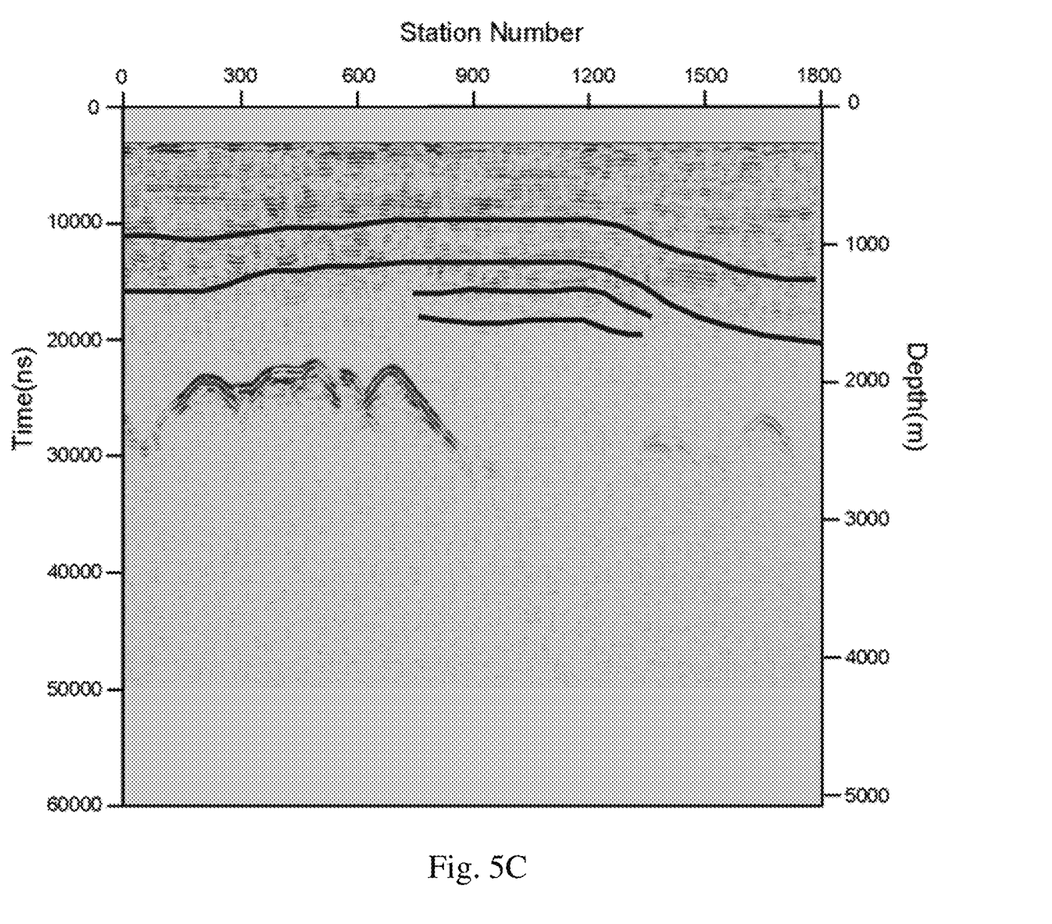
FIG. 5C is the average section view of orthogonal polarization directions, which blurs the energy difference of orthogonal polarization directions.
Figure 5D:
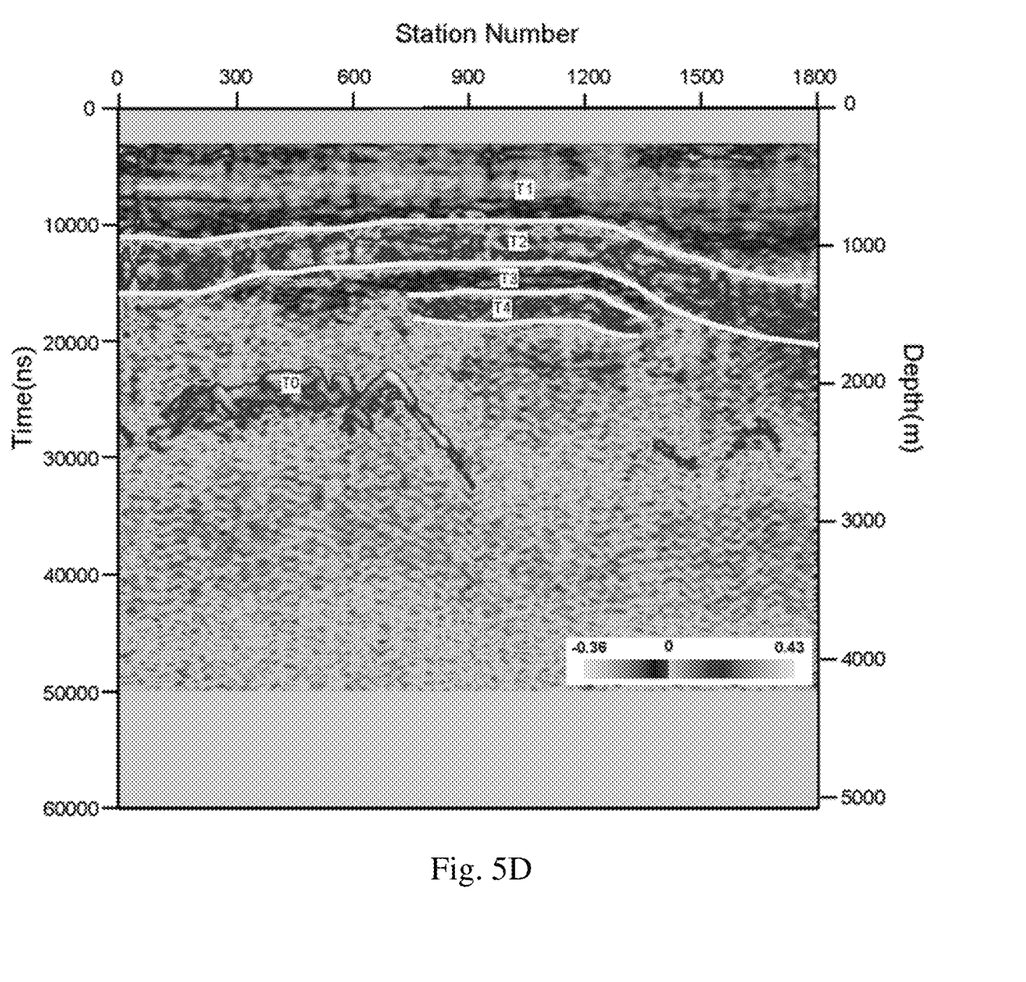
FIG. 5D is a section view of S1 component of Stokes vector (parameters related to fabric), showing the distribution and fluctuation of fabric in the ice sheet, especially the existence of alternating layers of soft and hard ice caused by glacial interglacial cycle.

The antenna of the polarimetric radar is used an orthogonal arrangement as shown in FIG. 4, the radar data of four channels $E_{HH}^r$, $E_{HV}^r$, $E_{VH}^r$ and $E_{VV}^r$ are obtained by the combination of the receiving and transmitting antennas. The ice crystals have obvious anisotropic characteristics: the radar echo of different polarization directions shows obvious amplitude difference, and the dielectric permittivity tensor inside the ice sheet can be reversely deduced by using this amplitude difference, and then the fabric type and its spatial distribution can be obtained. FIGS. 5A and 5B show the energy difference of radar echoes in different polarization directions caused by the anisotropy of ice fabric in VV and VH orthogonal directions. FIG. 5C is the average section view of orthogonal polarization directions, which blurs the energy difference of orthogonal polarization directions. FIG. 5D is a section view of S1 component of Stokes vector (parameters related to fabric), showing the distribution and fluctuation of fabric in the ice sheet, especially the existence of alternating layers of soft and hard ice caused by glacial interglacial cycle. However, Stokes vector can only qualitatively describe the spatial distribution characteristics of fabric, and at present, it cannot give the quantitative correlation to directly identify the type of fabric.

2.1 Fabric Type Identification Technology

The radar echo can be expressed by the product of the reflection coefficient matrix and the incident wave.

$$\vec{E}^r = \begin{bmatrix} E^r_{HH} & E^r_{VH} \\ E^r_{HV} & E^r_{VV} \end{bmatrix} = \overline{R} \cdot \vec{E}^i = \begin{bmatrix} R_{HH} & R_{VH} \\ R_{HV} & R_{VV} \end{bmatrix} \cdot \begin{bmatrix} E^i_H & 0 \\ 0 & E^i_V \end{bmatrix} \quad (9)$$

wherein, $E_H^i$ represents an electric field intensity of incident wave in H direction, and $E_V^i$ represents an electric field intensity of incident wave in V direction; In formula (9), the electric field intensity of the reflected echo $\vec{E}^r$ is not only related to the electric field intensity of the incident wave $\vec{E}^i$, but also related to the reflection coefficient $\overline{R}$. And the reflection coefficient is determined by the physical properties of the underground medium and the geometric position of the antenna and the medium. The reason of the formation of reflected wave is that the intrinsic impedance difference between the upper and lower layers (mainly the difference of dielectric constant in the ice sheet). Thus, the dielectric permittivity parameters of each layer can be obtained by the reflection coefficient sequence.

$$\overline{R} = \begin{bmatrix} R_{HH} & R_{VH} \\ R_{HV} & R_{VV} \end{bmatrix} = \begin{bmatrix} \dfrac{E^r_{HH}}{E^i_H} & \dfrac{E^r_{VH}}{E^i_V} \\ \dfrac{E^r_{HV}}{E^i_H} & \dfrac{E^r_{VV}}{E^i_V} \end{bmatrix} \quad (10)$$

The general expression of the reflection coefficient sequence received by polarized radar is shown as below:

$$\tilde{R} = \overline{R}_{12} + \overline{R}_{23} \cdot \delta(t-t_2) + \overline{R}_{34} \cdot \delta(t-t_3) + \ldots + \overline{R}_{i,i+1} \cdot \delta(t-t_i) + \quad (11)$$

wherein, $\tilde{R}_{i,i+1}$ represents the reflection coefficient matrix of the interface between the ith layer and the (i+1)th layer, $\delta(t-t_i)$ represents the impact pulse response matrix at time $t_i$, $t_i$ represents the delay time of the interface echo. The generalized reflection coefficient can be expressed by the geometrical optical progression of multiple reflections and transmissions between multi-layer media. Since the difference of dielectric permittivity of the isochronous ice layer in the ice sheet is small, multiple waves can be ignored, and only the first reflection wave is considered, the frequency domain expression of the generalized reflection coefficient of each layer has the following form:

$$\begin{cases} \tilde{R}_{12} = \overline{R}_{12} \\ \tilde{R}_{23} = \overline{T}_{12} \cdot e^{-j\bar{k}_2 d_2} \cdot \overline{R}_{23} \cdot e^{-j\bar{k}_2 d_2} \cdot \overline{T}_{21} \\ \tilde{R}_{34} = \overline{T}_{12} \cdot e^{-j\bar{k}_2 d_2} \cdot \overline{T}_{23} \cdot e^{-j\bar{k}_3 d_3} \cdot \overline{R}_{34} \cdot e^{-j\bar{k}_3 d_3} \cdot \overline{T}_{32} \cdot e^{-j\bar{k}_2 d_2} \cdot \overline{T}_{21} \\ \tilde{R}_{45} = \overline{T}_{12} \cdot e^{-j\bar{k}_2 d_2} \cdot \overline{T}_{23} \cdot e^{-j\bar{k}_3 d_3} \cdot \overline{T}_{34} \cdot e^{-j\bar{k}_4 d_4} \cdot \overline{R}_{45} \cdot e^{-j\bar{k}_4 d_4} \cdot \\ \quad \overline{T}_{43} \cdot e^{-j\bar{k}_3 d_3} \cdot \overline{T}_{32} \cdot e^{-j\bar{k}_2 d_2} \cdot \overline{T}_{21} \\ \ldots \\ \tilde{R}_{n-1,n} = \overline{T}_{12} \cdot e^{-j\bar{k}_2 d_2} \cdot \overline{T}_{23} \ldots \overline{T}_{n-2,n-1} \cdot e^{-j\bar{k}_{n-1} d_{n-1}} \cdot \\ \quad \overline{R}_{n-1,n} \cdot e^{-j\bar{k}_{n-1} d_{n-1}} \cdot \overline{T}_{n-1,n-2} \ldots \overline{T}_{32} \cdot e^{-j\bar{k}_2 d_2} \cdot \overline{T}_{21} \end{cases} \quad (12)$$

The calculation formulas of reflection coefficient, transmission coefficient and reverse transmission coefficient of the layer interface are shown in formula (13), (14)-(15) respectively:

$$\begin{cases} \overline{R}_{i,i+1} = -\dfrac{1}{|B_a|} \begin{bmatrix} (1+d)(1-a) + \\ (1+b)(1-c)tg^2(\varphi_{i+1}-\varphi_i) & 2(d-b)tg(\varphi_{i+1}-\varphi_i) \\ 2(c-a)tg(\varphi_{i+1}-\varphi_i) & (1+a)(1-d) + (1+c) \\ & (1-b)tg^2(\varphi_{i+1}-\varphi_i) \end{bmatrix} \\ |B_a| = (1+a)(1+d) + (1+b)(1+c)tg^2(\varphi_{i+1}-\varphi_i) \\ a = \sqrt{\dfrac{\varepsilon_{i,1}}{\varepsilon_{i+1,1}}} \quad b = \sqrt{\dfrac{\varepsilon_{i,2}}{\varepsilon_{i+1,1}}} \quad c = \sqrt{\dfrac{\varepsilon_{i,1}}{\varepsilon_{i+1,2}}} \quad d = \sqrt{\dfrac{\varepsilon_{i,2}}{\varepsilon_{i+1,2}}} \end{cases} \quad (13)$$

$$\overline{T}_{i,i+1} = \dfrac{2\cos(\varphi_{i+1}-\varphi_i)}{|B_a|} \begin{bmatrix} a(1+d) + & (b+ad)tg(\varphi_{i+1}-\varphi_i) + \\ (a+bc)tg^2(\varphi_{i+1}-\varphi_i) & b(1+c)tg^3(\varphi_{i+1}-\varphi_i) \\ -(c+ad)tg(\varphi_{i+1}-\varphi_i) - & d(1+a) + \\ c(1+b)tg^3(\varphi_{i+1}-\varphi_i) & (d+bc)tg^2(\varphi_{i+1}-\varphi_i) \end{bmatrix} \quad (14)$$

$$\overline{T}_{i,i+1} = \dfrac{2\sec(\varphi_{i+1}-\varphi_i)}{|B_a|} \begin{bmatrix} (1+d) & (1+b)tg(\varphi_{i+1}-\varphi_i) \\ (1+c)tg(\varphi_{i+1}-\varphi_i) & (1+d) \end{bmatrix} \quad (15)$$

wherein, $\overline{R}_{i,i+1}$ represents the interface reflection coefficient matrix between the ith layer and the (i+1)th layer, $\overline{T}_{i,i+1}$ represents the interface transmission coefficient matrix between the ith layer and the (i+1)th layer, $\overline{T}_{i+1,i}$ represents the reverse interface transmission coefficient matrix between the ith layer and the (i+1)th layer, $\tilde{R}_{i,i+1}$ represents the generalized reflection coefficient matrix of the interface between the ith layer and the (i+1)th layer in the radar echo record, $e^{-j\bar{k}_i d_i}$ represents the phase factor matrix of the ith layer, and $d_i$ represents the thickness of the ith layer. Here, the layer by layer recursive method is used, from the top to the bottom, starting from the reflection interface between the first layer and the second layer, because the layer above the first ground surface is isotropic air layer, the eigenvalue of the dielectric permittivity tensor are 1, and the rotation angle is 0, that is, $\varepsilon_{11}=1$, $\varepsilon_{12}=1$, $\varepsilon_{13}=1$ and $\phi_1=0$, substituting them into the reflection coefficient formula of the layer interface and combining the formula (10), (12) and (13), the eigenvalues $\varepsilon_{21}$, $\varepsilon_{22}$ and the rotation angle $\phi_2$ of the dielectric constant tensor of the second layer can be obtained, and then calculating the interface transmission coefficient matrix $T_{12}$ and the reverse transmission coefficient matrix $T_{21}$ by formulas (14) to (15). The obtained $T_{12}$, $T_{21}$, the dielectric constant tensors $\varepsilon_{21}$, $\varepsilon_{22}$ and the rotation angle $\phi_2$ of the second layer parameters, and the known $\tilde{R}_3$ are substituted into formula (12) to calculate to obtain $\overline{R}_{23}$, and then, taken into the layer interface reflection coefficient formula (13) to solve the equation group, to obtain the dielectric constant tensors $\varepsilon_{31}$, $\varepsilon_{32}$ and the rotation angle $\phi_3$ of the third layer parameters, and then according to the formula (13) to (15) to obtain $T_{23}$, $R_{23}$ and $T_{32}$ in sequence, and then the known $\tilde{R}_{34}$ are taken into the formula (12) with the previously results to obtain $\overline{R}_{34}$. And then recursively in order to calculate the eigenvalue and rotation angle of the dielectric constant tensor of the n layer.

According to the eigenvalues $\varepsilon_{i1}$, $\varepsilon_{i2}$ and rotation angle $\phi_i$ of the dielectric constant tensor of each layer obtained above, and according to the formulas (7) and (8) of the correlation between the orientation tensor and the dielectric permittivity tensor of ice crystal fabric, the eigenvalues $\alpha_1^{(2)}$, $\alpha_2^{(2)}$ and $\alpha_3^{(2)}$ and of the second-order orientation tensor of each layer can be calculated, and the type of fabric is identified according to Table 1. The rotation angle of each layer is used to construct and indicate the direction and spatial distribution of the fabric and ice flow.

3. Correlation Between Ice Flow Direction and Physical Property Parameters

The flow of ice is a macroscopic representation of the microscopic deformation of ice crystals under stress. Stress on ice crystals, on the one hand, promotes the deformation of ice crystals to form a flow phenomenon; on the other hand, it promotes the fabric evolution of ice crystals to form new types of fabrics. Therefore, the flow process and the flow direction of ice are closely related to the fabric evolution and crystal deformation, which are the results of stress acting on the ice crystal. Both the second-order fabric orientation tensor (optical physical property parameters) and the second-order dielectric constant tensor (electromagnetic physical property parameters) will change with the change of the stress field in the ice sheet. It also implies that these two parameters can be used to determine the direction of stress and ice flow.

There are mainly two forces acting on the ice sheet: the vertical positive pressure due to gravity and the lateral shear force (or lateral tensile force) due to the slope. Previous experimental studies have shown that the C-axis direction of ice crystals tends to gather toward the positive pressure axis, is perpendicular to the shear force axis, and is far from the tensile force axis. Therefore, the morphology of the fabric also reflects the degree of stress and deformation of the crystal, and the direction of the force indicates the direction of ice flow.

FIG. 2 and FIG. 3 show the change trend of ice crystal fabric under the action of normal stress and lateral shear force inside the ice sheet. In the ice dome area, the lateral shear force is tiny, the C-axis of the crystal is gradually gathered under the normal stress of the gravity action, tending to the dominant direction to forming an extreme, which is consistent with the single-pole situation in Table 1. At this time, the XY axis of the dielectric permittivity tensor and the fabric tensor coincide with the horizontal plane, the C-axis tends to gather vertically (Z-axis direction), and the values of the dielectric constant in the horizontal plane are equal. As the ice flows downstream, the lateral shear force gradually increases (mainly lateral stretching), the shear force stretches the C-axis surface (from a circle to an ellipse), and the short axis of the ellipse indicates the lateral tensile force and ice flow direction (X-axis direction). When the lateral tensile deformation is large enough (or the fabric is stretched to a certain extent), from the elongated single-pole goes to the other extreme, forming a vertical girdle. At this time, the C-axis is arbitrarily distributed in the YZ plane perpendicular to the ice flow direction (the X direction in FIG. 3 is the direction of the lateral tensile force and the ice flow direction). Therefore, the ice flow direction can be determined according to the morphology of the fabric, that is, the short axis direction of the ellipse in the fabric Schmidt diagram and the direction perpendicular to the strip in the girdle structure.

4. Ice Flow Direction Recognition Technology

The eigenvalues $\alpha_1^{(2)}$, $\alpha_2^{(2)}$, $\alpha_3^{(2)}$ and, the rotation angle $\phi_i$ of the orientation tensor of fabric in each layer are obtained by the layer by layer recursive method, not only gives the type of fabric, but also gives the deflection direction of fabric. Because the tensile direction of fabric is closely related to the stress deformation and the ice flow direction, it also indicates the direction of lateral tensile force and ice flow direction. According to the size comparison between the obtained and $\alpha_1^{(2)}$ and $\alpha_2^{(2)}$, the rotation angle $\phi_i$, the ice flow direction of each layer can be further obtained. The polarimetric radar is usually a section or three-dimensional measurement. The spatial distribution characteristics of the ice flow direction in the ice sheet can be constructed and analyzed by combining the ice flow direction of all measuring points in the depth direction.

What is claimed is:

1. A method for identifying ice crystal fabric and distribution characteristics of ice flow field in ice sheet based on polarimetric radar, the method comprising:

providing an orthogonal arrangement receiving and transmitting antenna of the polarimetric radar;

acquiring radar data of four channels, $E_{HH}^r$, $E_{HV}^r$, $E_{VH}^r$ and $E_{VV}^r$, by the orthogonal arrangement receiving and transmitting antenna of the polarimetric radar;

performing normalization processing on the radar data $E_{HH}^r$, $E_{HV}^r$, $E_{VH}^r$ and $E_{VV}^r$ obtained in step 1 to obtain the radar echo records of four channels $R_{HH}$, $R_{HV}$, $R_{VH}$ and $R_{VV}$;

$$\bar{R} = \begin{bmatrix} R_{HH} & R_{VH} \\ R_{HV} & R_{VV} \end{bmatrix} = \begin{bmatrix} \frac{E_{HH}^r}{E_H^i} & \frac{E_{VH}^r}{E_V^i} \\ \frac{E_{HV}^r}{E_H^i} & \frac{E_{VV}^r}{E_V^i} \end{bmatrix} \quad (1)$$

wherein, $E_H^i$ represents an electric field intensity of incident wave in H direction, and $E_V^i$ represents an electric field intensity of incident wave in V direction;

performing deconvolution processing on the radar echo records of four channels $R_{HH}$, $R_{HV}$, $R_{VH}$ and $R_{VV}$, to obtain the generalized reflection coefficient sequences of four channels $\tilde{R}_{HH}$, $\tilde{R}_{HV}$, $\tilde{R}_{VH}$ and $\tilde{R}_{VV}$, recorded together as $$\tilde{R} = \begin{bmatrix} \tilde{R}_{HH} & \tilde{R}_{VH} \\ \tilde{R}_{HV} & \tilde{R}_{VV} \end{bmatrix};$$

calculating the eigenvalue and deflection angle of dielectric permittivity tensor in each layer from top to bottom by layer-by-layer recursive method, wherein the derivation from the first layer to the n-1 layer is shown in formula (2), and the interface reflection coefficient matrix formula, transmission coefficient matrix formula and reverse transmission coefficient matrix formula are shown in formulas (3) to (5), respectively:

$$\begin{cases} \tilde{\bar{R}}_{12} = \bar{R}_{12} \\ \tilde{\bar{R}}_{23} = \bar{T}_{12} \cdot e^{-j\bar{k}_2 d_2} \cdot \bar{R}_{23} \cdot e^{-j\bar{k}_2 d_2} \cdot \bar{T}_{21} \\ \tilde{\bar{R}}_{34} = \bar{T}_{12} \cdot e^{-j\bar{k}_2 d_2} \cdot \bar{T}_{23} \cdot e^{-j\bar{k}_3 d_3} \cdot \bar{R}_{34} \cdot e^{-j\bar{k}_3 d_3} \cdot \bar{T}_{32} \cdot e^{-j\bar{k}_2 d_2} \cdot \bar{T}_{21} \\ \tilde{\bar{R}}_{45} = \bar{T}_{12} \cdot e^{-j\bar{k}_2 d_2} \cdot \bar{T}_{23} \cdot e^{-j\bar{k}_3 d_3} \cdot \bar{T}_{34} \cdot e^{-j\bar{k}_4 d_4} \cdot \bar{R}_{45} \cdot e^{-j\bar{k}_4 d_4} \cdot \\ \quad \bar{T}_{43} \cdot e^{-j\bar{k}_3 d_3} \cdot \bar{T}_{32} \cdot e^{-j\bar{k}_2 d_2} \cdot \bar{T}_{21} \\ \cdots \\ \tilde{\bar{R}}_{n-1,n} = \bar{T}_{12} \cdot e^{-j\bar{k}_2 d_2} \cdot \bar{T}_{23} \cdots \bar{T}_{n-2,n-1} \cdot e^{-j\bar{k}_{n-1} d_{n-1}} \cdot \\ \quad \bar{R}_{n-1,n} \cdot e^{-j\bar{k}_{n-1} d_{n-1}} \cdot \bar{T}_{n-1,n-2} \cdots \bar{T}_{32} \cdot e^{-j\bar{k}_2 d_2} \cdot \bar{T}_{21} \end{cases} \quad (2)$$

-continued $$\overline{R}_{i,i+1} = \begin{bmatrix} R_{HH}^{(i)} & R_{HV}^{(i)} \\ R_{VH}^{(i)} & R_{VV}^{(i)} \end{bmatrix} \quad (3)$$

$$= -\frac{1}{|B_a|} \begin{bmatrix} (1+d)(1-a) + & \\ (1+b)(1-c)tg^2(\varphi_{i+1}-\varphi_i) & 2(d-b)tg(\varphi_{i+1}-\varphi_i) \\ & (1+a)(1-d)+(1+c) \\ 2(c-a)tg(\varphi_{i+1}-\varphi_i) & (1-b)tg^2(\varphi_{i+1}-\varphi_i) \end{bmatrix}$$

$$|B_a| = (1+a)(1+d) + (1+b)(1+c)tg^2(\varphi_{i+1}-\varphi_i)$$

$$a = \sqrt{\frac{\varepsilon_{i,1}}{\varepsilon_{i+1,1}}} \quad b = \sqrt{\frac{\varepsilon_{i,2}}{\varepsilon_{i+1,1}}} \quad c = \sqrt{\frac{\varepsilon_{i,1}}{\varepsilon_{i+1,2}}} \quad d = \sqrt{\frac{\varepsilon_{i,2}}{\varepsilon_{i+1,2}}}$$

$$T_{i,i+1} = \quad (4)$$

$$\frac{2\cos(\varphi_{i+1}-\varphi_i)}{|B_a|} \begin{bmatrix} a(1+d) + & (b+ad)tg(\varphi_{i+1}-\varphi_i) + \\ (a+bc)tg^2(\varphi_{i+1}-\varphi_i) & b(1+c)tg^3(\varphi_{i+1}-\varphi_i) \\ -(c+ad)tg(\varphi_{i+1}-\varphi_i) - & d(1+a) + \\ c(1+b)tg^3(\varphi_{i+1}-\varphi_i) & (d+bc)tg^2(\varphi_{i+1}-\varphi_i) \end{bmatrix}$$

$$\overline{T}_{i,i+1} = \frac{2\sec(\varphi_{i+1}-\varphi_i)}{|B_a|} \begin{bmatrix} (1+d) & (1+b)tg(\varphi_{i+1}-\varphi_i) \\ (1+c)tg(\varphi_{i+1}-\varphi_i) & (1+d) \end{bmatrix} \quad (5)$$

wherein, $\overline{R}_{i,i+1}$ represents the interface reflection coefficient matrix between the i th layer and the (i+1)th layer, $T_{i,i+1}$ represents the interface transmission coefficient matrix between the i th layer and the (i+1)th layer, $\overline{T}_{i+1,i}$ represents the reverse interface transmission coefficient matrix between the i th layer and the (i+1)th layer, $\overline{\overline{R}}_{i,i+1}$ represents the generalized reflection coefficient matrix of the interface between the i th layer and the (i+1)th layer in the radar echo record, $e^{-jk_j d_i}$ represents the phase factor matrix of the i th layer, and $d_i$ represents the thickness of the i th layer; the layer above the first ground surface is an isotropic air layer, the eigenvalue of the dielectric permittivity tensor is 1, and the rotation angle is 0, that is, $\varepsilon_{11}$=1, $\varepsilon_{12}$=1, $\varepsilon_{13}$=1 and $\varphi_1$=0, are substituting into the formulas (1) to (3) to obtain the eigenvalues $\varepsilon_{21}$, $\varepsilon_{22}$ and the rotation angle $\varphi_2$ of the dielectric permittivity tensor of the second layer, and then calculating the interface transmission coefficient matrix $T_{12}$ and the reverse transmission coefficient matrix $\overline{T}_{21}$ by formulas (4) and (5), and then recursively in order to calculate the eigenvalue and rotation angle of the dielectric constant tensor of the n layer;

calculating the eigenvalues $a_1^{(2)}$, $a_2^{(2)}$ and $a_3^{(2)}$ of the second-order orientation tensor of each layer according to the eigenvalues $\varepsilon_{i1}$, $\varepsilon_{i2}$ and rotation angle $\varphi_i$ of the dielectric permittivity tensor of each layer obtained from S4, and according to the formulas (6) and (7) of the correlation between the orientation tensor and the dielectric permittivity tensor of ice crystal fabric;

$$a_j^{(2)} = \frac{\sqrt{\varepsilon_{i,j}} - \sqrt{\varepsilon_\perp}}{\sqrt{\varepsilon_{//}} - \sqrt{\varepsilon_\perp}} \quad j = 1, 2; \, i \text{ is the layer number;} \quad (6)$$

$$a_3^{(2)} = 1 - a_1^{(2)} - a_2^{(2)} \quad (7)$$

wherein, $\varepsilon_\perp$ and $\varepsilon_{||}$ represent the dielectric permittivity s that perpendicular to a C-axis and parallel to the C-axis respectively, which are measured in the laboratory; the second-order fabric orientation tensor calculated according to formula (6) and formula (7) is used to determine a fabric type of the ice crystal; and determining a stress state of the ice crystal according to the fabric type and the distribution characteristics of the C-axis, in which the direction of tensile force is the direction of ice flow; and extracting the flow direction of ice layer with different depth layer by layer, to obtain the spatial distribution characteristics of ice flow field.

2. The method according to claim 1, wherein the deconvolution processing in S3 uses a sparse spike deconvolution method.

3. The method according to claim 1, wherein the reflection coefficient matrix formula of the layer interface (3) is deformable as formulas (8) or (9) to solve eigenvalues $\varepsilon_{i+1,1}, \varepsilon_{i+1,2}$ of the dielectric constant tensor of the lower layer, and as formulas (10) or (11) to use to solve the rotation angle $\varphi_{i+1}$ of the lower layer:

$$\begin{cases} (1+a)(1+b)(R_A + R_B \cdot c)(R_C + R_D \cdot d) = \\ \quad (1+c)(1+d)(R_A + R_B \cdot a)(R_C + R_D \cdot b) \\ 2(c-a)(b-d)^2(R_A + R_B \cdot c) + (1+a)(b-d)^2(R_A + R_B \cdot c)^2 + \\ \quad R_{HV}^{(i)} \cdot R_{HV}^{(i)}(1+b)(1+c)(1+d)(c-a)^2 = 0 \\ R_A = R_{HH}^{(i)} + 1 \quad R_B = R_{HH}^{(i)} - 1 \quad R_C = R_{VV}^{(i)} + 1 \quad R_D = R_{VV}^{(i)} - 1 \end{cases} \quad (8)$$

$$\begin{cases} (1+a)(1+b)(R_A + R_B \cdot c)(R_C + R_D \cdot d) = \\ \quad (1+c)(1+d)(R_A + R_B \cdot a)(R_C + R_D \cdot b) \\ 2(c-d)(a-c)^2(R_C + R_D \cdot b) + (1+d)(a-c)^2(R_C + R_D \cdot b)^2 + \\ \quad R_{VH}^{(i)} \cdot R_{VH}^{(i)}(1+a)(1+b)(1+c)(b-d)^2 = 0 \\ R_A = R_{HH}^{(i)} + 1 \quad R_B = R_{HH}^{(i)} - 1 \quad R_C = R_{VV}^{(i)} + 1 \quad R_D = R_{VV}^{(i)} - 1 \end{cases} \quad (9)$$

$$\begin{cases} tg(\varphi_{i+1} - \varphi_i) = \frac{R_{HV}^{(i)}(1+d)(c-a)}{(b-d)(R_A + R_B \cdot c)} \\ R_A = R_{HH}^{(i)} + 1 \quad R_B = R_{HH}^{(i)} - 1 \end{cases} \quad (10)$$

$$\begin{cases} tg(\varphi_{i+1} - \varphi_i) = \frac{R_{VH}^{(i)}(1+a)(b-d)}{(a-c)(R_C + R_D \cdot c)} \\ R_C = R_{VV}^{(i)} + 1 \quad R_D = R_{VV}^{(i)} - 1 \end{cases} \quad (11)$$

wherein, the sums $R_{HH}^{(i)}$, $R_{HV}^{(i)}$, $R_{VH}^{(i)}$ and $R_{VV}^{(i)}$ in the formulas (8) to (11) are the four components of the interface reflection coefficient matrix $\overline{R}_{i,i+1}$ between the i th layer and the (i+1)th layer obtained by the formula (3).

* * * * *